United States Patent Office 3,435,090
Patented Mar. 25, 1969

3,435,090
CALCINATION OF PLATINUM-ALUMINA CATALYST FOR ALKANE DEHYDROGENATION
Joseph B. Abell, Jr., St. Louis, Mo., Loyd W. Fannin, Dickinson, Tex., and James F. Roth, St. Louis, Mo., assignors to Monsanto Company, St. Louis, Mo., a corporation of Delaware
No Drawing. Continuation-in-part of application Ser. No. 421,720, Dec. 28, 1964. This application Apr. 19, 1967, Ser. No. 631,901
Int. Cl. C07c 5/18; B01j 11/12
U.S. Cl. 260—683.3                                    10 Claims

ABSTRACT OF THE DISCLOSURE

A process for the dehydrogenation of saturated hydrocarbons of 2 to 30 carbon atoms in the presence of hydrogen. The process utilizes a noble metal on alumina catalyst prepared by impregnating the alumina with the noble metal, drying, calcining in air at less than 450° C. and reducing the catalyst before use.

RELATED APPLICATIONS

The present invention is a continuation-in-part of application Ser. No. 421,720, filed Dec. 28, 1964, now abandoned.

BACKGROUND OF THE INVENTION

Field of the invention

The present invention relates to the catalytic conversion of hydrocarbons. More particularly, the present invention relates to a catalyst, a method of preparation of the catalyst and a process for the use of the catalyst whereby saturated hydrocarbons are converted by dehydrogenation to monoethylenically unsaturated hydrocarbons.

The prior art

The use of noble metals as catalytic agents is well known in the prior art. Generally, the noble metal catalytic agents have been proposed in combination with a carrier or support material such as alumina, silica, silica-alumina, silica-magnesia and others. Such compositions usually contain minor amounts of catalytically active noble metals seldom greater than 5 percent by weight. These noble metal containing catalysts have been used and suggested for such hydrocarbon conversion reactions as dehydrocyclization, reforming, hydrogenation, dehydrogenation, polymerization, alkylation, cracking, etc. However, because of the cost of the noble metal catalysts in relation to their catalytic activity, both initially and over a continued period of time, they have not always found wide commercial acceptance.

In order to improve both the initial and continued activity and to modify the activity of the noble metal containing catalyst, considerable attention has been directed to modifying the catalytic properties of such catalysts. The efforts to modify the properties of the catalysts have taken the form of varying the concentration and choice of components for combination with the noble metals. In addition, the prior art has shown that surprisingly different results are obtained when the noble metals are impregnated on different supports. Further, it has been shown that even the choice of the particular noble metal salts from which the noble metl is impregnated onto the support is of criticality in many ultilities of noble metal catalysts. The acidity of the noble metal containing catalyst has also been shown to be highly important. Further, in copending application Ser. No. 421,622 filed Dec. 28, 1964 it has been shown that even the order of impregnation of components including a noble metal and an alkali or alkaline earth metal is of vital importance. Thus, it is apparent that many factors enter into the adaptation and optimization of noble metal containing catalysts in the various utilities to which such catalysts may be put.

It is an object of the present invention to provide a catalyst, a method for its preparation, and a process for the conversion of hydrocarbons. Another object of the present invention is to provide a catalyst, a method for its preparation and a process for its use whereby saturated hydrocarbons are converted by dehydrogenation to monoethylenically unsaturated hydrocarbons. Yet another object of the present invention is to provide a noble metal containing catalyst, a method for its preparation and a process for its use in the conversion of hydrocarbons. Another object of the present invention is to provide a noble metal containing catalyst, a method for its preparation and a process for its use in the conversion of saturated hydrocarbons to monoethylenically unsaturated hydrocarbons whereby substantially increased catalytic activity is obtained. Additional objects will become apparent from the following description of the invention herein disclosed.

SUMMARY OF THE INVENTION

The present invention, which fulfills these and other objects, is a catalyst, a method for its preparation and a process for the dehydrogenation of saturated hydrocarbons to ethylenically unsaturated hydrocarbons. The catalyst is a noble metal containing catalyst comprising an alumina having a surface area of at least 100 square meters per gram and a macropore volume of at least 0.14 cc. per gram impregnated with 0.02 to 5.0 percent by weight of a noble metal, said catalyst having been calcined in air at a temperature not over 450° C. for 2 to 12 hours prior to reduction. This catalyst is prepared by impregnating the alumina with a noble metal, drying the impregnated alumina, calcining the dried impregnated alumina in air at a temperature of not over 450° C. for 2 to 12 hours and then subjecting the calcined impregnated alumina to reduction to form the active catalyst. The dehydrogenation process of the present invention comprises contacting saturated hydrocarbons in the presence of hydrogen at elevated temperatures and suitable pressures for a time sufficient to produce monoethylenically unsaturated hydrocarbons with the hereinabove described catalyst.

The catalyst and process of the present invention result in a significantly improved activity of the catalyst both initially and throughout the period of use of the catalyst. In addition, the dehydrogenation process involving the catalyst of the present invention results in improved conversion of saturated hydrocarbons to monoethylenically unsaturated hydrocarbons. Further, with the catalyst of the present invention, when used in the dehydrogenation process of the present invention, undesirable side reactions such as cracking, skeletal isomerization and aromatization as well as the formation of polyethylenically unsaturated hydrocarbons and carbon are substantially reduced.

By "noble metal," as that term is used herein, is meant a metal selected from the group consisting of platinum, palladium, iridium, ruthenium, osmium, and rhodium. While all of these metals included within the scope of the term "noble metal" as defined above, are useful in preparing the catalyst composition of the present invention, the noble metals preferred in practicing the present invention are platinum and palladium. In the particularly preferred manner of practicing the present invention, the noble metal most often used in the catalyst composition is platinum.

DESCRIPTION OF THE PREFERRED EMBODIMENTS OF THE INVENTION

In order to further describe as well as to illustrate the present invention, the following examples are presented. These examples are not to be construed as in any manner limiting the present invention.

Example I

Two catalysts were prepared from an alumina having a surface area of 220 square meters per gram and a macropore volume of 0.20 cc. per gram and a sodium content of 0.30 percent. The alumina was in the form of ⅛ inch diameter balls. Each of the catalysts were prepared by treating the alumina in a solution of platinum-diamino-dinitrite salt. The platinum-diamino-dinitrite salt was prepared by heating an amount of this salt sufficient to obtain a platinum concentration of 0.0030 gram of platinum per ml. of catalyst "bulk volume" in distilled water and adding 10 ml. of concentrated ammonium hydroxide per gram of platinum salt present and after dissolving the salt, adjusting the volume of the solution by addition of water to an amount sufficient to totally saturate the alumina. The two catalysts were dried in air for 9 hours at 150° C. One of the dried catalysts, hereinafter designated Catalyst A, was then calcined in air at 400° C. for 2 hours while the other catalyst, hereinafter designated Catalyst B, was calcined in air at 500° C. for 2 hours. Both of these catalysts were then reduced in pure hydrogen at 440° C. for 1 hour. Each of these catalysts was found to contain approximately 0.45 percent by weight of platinum.

To demonstrate the advantages obtained from the catalyst and process of the present invention, the dehydrogenation of an n-dodecane feed was carried out in the presence of both Catalyst A and Catalyst B. The reaction conditions in both dehydrogenation runs were substantially the same, the temperature being 440° C., the pressure at substantially atmospheric pressure (±2 p.s.i.) and a liquid hourly space velocity of the hydrocarbon of 4.65. Hydrogen was introduced concurrently with the n-dodecane in a mole ratio of hydrogen of 2:1. The following table gives the percent conversion to monoolefins of the n-dodecane and the yield of monoolefin in the conversion product for each of the two catalysts, Catalyst A and Catalyst B.

|  | Conversion | Yield |
|---|---|---|
| Catalyst A | 14.0 | 71.0 |
| Catalyst B | 11.6 | 76.5 |

Example II

Additional catalysts were prepared in the manner of Catalyst A of Example I with the exception that varying calcination temperatures and times were used. Further, the alumina support in each case was one which had been precalcined in air for 2 hours at 600° C. These catalysts were tested for dehydrogenation efficiency according to the process of the present invention as described in Example I above. The following table presents the percent conversion obtained with these catalysts along with the temperature and time of calcination.

| Catalyst | Calc. temp., ° C. | Cal. time, hrs. | Conversion |
|---|---|---|---|
| C | 500 | 4 | 13.4 |
| D | 450 | 4 | 14.1 |
| E | 400 | 2 | 15.1 |
| F | 350 | 4 | 15.4 |
| G | 450 | 2 | 14.5 |
| H | 500 | 2 | 13.7 |

A comparison of the results obtained with the catalysts prepared in accordance with the present invention, Catalysts D, E, F and G, with those obtained with Catalysts C and H of Example II demonstrates the improvement obtained with the catalysts of the present invention. Further, the importance of the critical limitation of the present catalyst is illustrated by such comparison.

Example III

A third catalyst, hereinafter designated Catalyst I was prepared exactly as was Catalyst A of Example I except calcination was for 12 hours at 500° C. and the alumina used was one having a surface area of 72, a macropore volume of 0.12 cc. per gram and a sodium content of 0.2 percent. After the calcination, the catalyst was found to contain approximately 0.29 percent by weight of platinum.

Catalyst I was compared with Catalysts C and F of Example II by measuring the dispersion of the platinum on the alumina support in the finished catalyst. Dispersion was determined by hydrogen chemisorption according to the technique described in Journal of Physical Chemistry, vol. 66, p. 48, (1962), and is measured in terms of the hydrogen absorbed as related to the amount of noble metal present and is expressed as a hydrogen to noble metal atomic ratio. The results of this comparison is presented below

| Catalyst: | H/Pt. |
|---|---|
| C | 0.67 |
| F | 0.90 |
| I | 0.97 |

The above results indicate the criticality of the calcination stage of the present invention with respect to dispersion of the noble metal in the noble metal catalysts prepared from the alumina support disclosed herein. As is shown by Example II above, wherein the conversion of catalysts C and F are compared, dispersion is a critical factor in obtaining the improved conversion resulting from the present invention.

Example IV

A catalyst was prepared as illustrated in Example I above with the exception that the final catalyst contained 0.3 percent by weight of sodium and 0.43 percent by weight of platinum and the alumina used had a macropore volume of 0.18 cc. per gram. The final calcination of this catalyst was for 2 hours at 450° C.

The catalyst so prepared was then used in the dehydrogenation of n-heptane according to the process of Example I except that a temperature of 470° C. and a liquid hourly space velocity of 2.5 were used. The monoolefin product obtained represented a 13.8 percent conversion and a yield of 71.5 percent.

The amount of noble metal present in the catalyst of the present invention may vary from as low as 0.02 percent by weight of the total composition to as high as 5.0 percent by weight of the total composition. The optimum amount of noble metal present in the catalyst of the present invention will, of course, vary to some extent depending upon the particular utility to which the catalyst is put. However, it usually will be within these defined limits. Generally, amounts of the noble metals of the present invention in excess of the above limits are avoided because of the relatively high cost of these metals. Noble metal concentrations below those defined above, usually are impractical to use because of rather low conversions. In using the catalyst composition of the present invention for the dehydrogenation of saturated hydrocarbons the concentration of noble metal in the catalyst composition is usually within the range of from approximately 0.02 to 2.0 percent by weight of the total catalyst, preferably 0.02 to 1.0 percent by weight of the total catalyst. In the preferred practice of the present invention in which platinum or palladium are used as the noble metal constituents of the catalyst and which the catalyst is used in the dehydrogenation of saturated hydrocarbons, it is preferred that the amount of these noble metals present in the catalyst composition be within the range of 0.1 to 1.0 percent by weight of the total composition.

In addition to the noble metal and the alumina support of the catalyst of the present invention, it is often desired that the catalyst contain a promoting metal such as an alkali metal or an alkaline earth metal. Among the alkali metals useful in the present invention are sodium, potassium, lithium, rubidium and cesium. The alkali metals preferred in the present catalyst composition are sodium and potassium. The alkaline earth metals include calcium, barium, strontium and magnesium. Preferably, calcium or magnesium is used as the alkaline earth metal in the catalysts of the present invention is usually at least 0.14 cc.

When an alkali or alkaline earth metal is used in the present catalyst compositions, it is most often present in an amount of at least 0.01 percent by weight of the total catalyst composition usually, within the range of 0.01 to 20 percent by weight of the catalyst composition. However, it is usually somewhat preferred that the amount of the alkali or alkaline earth metal present in the catalyst be within the range of from approximately 0.02 to 5.0 percent by weight of the total catalyst composition. The alumina supports of the catalyst of the present invention generally possess certain specifically defined characteristics. These alumina supports most often have a surface area of at least 100 square meters per gram, preferably greater than 125 square meters per gram. The macropore volume of the alumina supports most useful in the catalysts of the present invention is usually at least 0.14 cc. per gram. Preferably, however, the macropore volume of the alumina support is at least 0.16 cc. per gram. Macropore volume as used herein refers to the total volume of pores within the alumina having a pore radius of greater than 350 angstroms per unit weight of alumina. The macropore volume is expressed herein in terms of cubic centimeters per gram of alumina of pores having a radius greater than 350 angstroms. The macropore volume is determined by Aminco-Winslow mercury porosimeter, Model 5–7107 (American Instrument Company) or equivalent mercury penetration apparatus and represents the internal volume penetrated between 0 and 2500 p.s.i.g. A discussion of macropore volume determination is found in Industrial and Engineering Chemistry, 17, 787 (1945).

The catalyst compositions of the present invention preferably contain the noble metal in a highly and uniformly dispersed state. High dispersion of the noble metal on the alumina support has been found to have a considerable effect on the efficiency of the catalyst of the present invention. Particularly is this so when these catalysts are used in the dehydrogenation process of the present invention. A high dispersion of noble metal on the catalyst support contributes to maximum utilization of the noble metal in the catalyst composition as well as to increased catalyst activity. Preparation of the catalyst composition of the present invention in accordance with the method described herein contributes very materially to high dispersion of the noble metal on the alumina support.

The method by means of which the dehydrogenation catalysts of the present invention are prepared generally involves contacting the catalyst support with a solution comprised of a noble metal salt dissolved in a suitable solvent. The amount of metal salt dissolved in the solvent usually is that amount sufficient to place the desired amount of the metal on the alumina support. Determination of this amount of metal salt is readily within the ability of those skilled in the art. The method of contacting the metal salt solution with the alumina support may be by pouring the solution over the support, by totally immersing the support within the solution, by treating the support with just enough of the solution to be completely absorbed by the alumina support, by spraying or other conventional method. In many instances, it may be desirable to mildly agitate the impregnating noble metal salt containing solution to aid contact between the solution and the alumina support.

After the catalyst support has been contacted with the impregnating solution of solvent and noble metal salt, the impregnated support is then dried in air or other such atmosphere to visible dryness. This drying step is most often carried out at temperatures within the range of from 100 to 200° C. On completion of drying, the catalyst is subjected to calcination which is one of the most critical steps in the preparation of the catalysts of the present invention. Calcination in accordance with the present invention, is carried out by heating the catalyst in the presence of air or other free oxygen containing atmosphere at a temperature of no greater than 450° C. for the entire period until the complete calcination of the catalyst. Usually, calcination is carried out at a temperature of 200 to 400° C. for a period of 2 to 12 hours. The critical importance of this calcination step, which is carried out at temperatures substantially below those generally employed, is clearly demonstrated in the specific examples hereinabove presented.

After the catalyst composition of the present invention has been calcined it is next subjected to reduction in the presence of hydrogen or other reducing gas in order to obtain the noble metal in a reduced form. Usually reduction temperatures in excess of 300° C. are used.

The dehydrogenation process of the present invention is generally operated at elevated temperatures. Most often these temperatures are within the range of from approximately 400 to 640° C. At temperatures below this range, conversions are so low that reaction becomes impractical while at temperatures above this range excessive side reactions occur. The preferred temperatures for operating the present dehydrogenation process with the preferred hydrocarbon feed are within the range of from approximately 420 to 520° C.

Pressures at which the present process is operable are somewhat critical to the present invention. The pressure may range from sub-atmospheric pressure up to 100 p.s.i.g. and higher. However, in most instances, pressures substantially atmospheric, i.e. 0 to 30 p.s.i.g., are used. High pressures are less preferred than low pressures since at higher pressures catalyst conversions are significantly reduced.

The contact time of the saturated hydrocarbons with the catalyst of the present invention in accordance with the dehydrogenation process disclosed herein will seldom be above 5.0 seconds or below 0.05 second. At contact times above this range there is excessive formation of aromatics, polyolefinic compounds and cracked products. Preferably, a contact time of 0.1 to 2.0 seconds will be used in the practice of the present dehydrogenation process.

One of the most important process limitations of the dehydrogenation process of the present invention is found in the use of a diluent with a hydrocarbon feed to be dehydrogenated. The most commonly used diluent is hydrogen. Hydrogen is usually present in a mole ratio of hydrogen to the saturated hydrocarbon feed of from approximately 0.1:1 to 5:1. However, it is preferred that a hydrogen to hydrocarbon mole ratio of 1:1 to 3:1 be used in operating the present invention.

The feedstocks to the dehydrogenation process of the present invention are saturated hydrocarbons. Included within this group are the straight-chain, branched-chain and cyclic saturated hydrocarbons. Such hydrocarbons may be of from 2 to 30 carbon atoms. Included within this group are such compounds as ethane, propane, butane, pentane, methylpentanes, hexane, methylhexanes, dimethylhexanes, cyclopentanes, cyclohexanes, methylcyclopentanes, methylcyclohexanes, heptane, methylheptanes, nonane, isononane, decane, isodecane, dodecane, isododecane and the like. A particularly effective utilization of the present invention, both the catalyst of the present invention and the dehydrogenation process disclosed herein, resides in the dehydrogenation of straight-chain paraffin hydrocarbons, particularly those of 10 to 18 carbon atoms. The product of the dehydrogenation of these straight-chain hydrocarbons has been found quite unexpectedly to provide an alkylate for the preparation of alkyl aromatic sulfonate detergent compositions which are substantially biodegradable. The preferred feeds of the present invention are those having 6 to 20 carbon atoms per molecule.

In carrying out the dehydrogenation process of the present invention, superficial linear velocities of the reactants within the dehydrogenation reactors most often used are within the range of 0.2 to 15 feet per second. Usually within this range superficial linear velocities toward the higher end of the range are preferred.

The apparatus and arrangement of apparatus for carrying out the dehydrogenation process of the present invention is not particularly critical. It is only necessary that good engineering principles be followed in the design and arrangement of the equipment.

What is claimed is:

1. In the preparation of catalyst compositions consisting essentially of 0.02 to 5.0 percent by weight of a noble metal dispersed upon an alumina support having a surface area of at least 100 square meters per gram and a macropore volume of at least 0.14 ml. per gram comprising the steps of (1) impregnating said alumina with a noble metal, (2) drying the impregnated alumina to visible dryness, (3) calcining the dried impregnated alumina in air and (4) subjecting the resulting catalyst composition to reduction prior to use, the improvement which comprises carrying out the entire calcination of step (3) at a temperature of no greater than 450° C.

2. The method of claim 1 wherein the entire calcination is carried out at a temperature of 200 to 400° C. and is for a period of 2 to 12 hours.

3. The method of claim 1 wherein the noble metal is platinum.

4. The method of claim 1 wherein the noble metal is palladium.

5. The method of claim 1 wherein the alumina support contains a metal selected from the group consisting of alkali and alkaline earth metals in an amount sufficient to cause a concentration of such metal in the finished catalyst composition of at least 0.01 percent by weight.

6. A process for dehydrogenation of saturated hydrocarbons of 2 to 30 carbon atoms to monoethylenically unsaturated hydrocarbons which comprises contacting said saturated hydrocarbons concurrently with hydrogen in a mole ratio of hydrogen to saturated hydrocarbons of 0.1:1 to 5:1 at a temperature of 400 to 650° C. and at a pressure of no greater than 100 p.s.i.g. and space velocity sufficient to cause dehydrogenation of said saturated hydrocarbons with a catalyst comprising an alumina having a surface area of at least 100 square meters per gram and a macropore volume of at least 0.14 ml. per gram impregnated with 0.02 to 5.0 percent by weight of a noble metal, said catalyst having been calcined in air until complete calcination at a temperature of no greater than 450° C. prior to reduction.

7. The process of claim 6 wherein said complete calcination is carried out at a temperature of 200 to 400° C. and is for a period of 2 to 12 hours.

8. The process of claim 6 wherein said noble metal is platinum.

9. The process of claim 6 wherein said noble metal is palladium.

10. The process of claim 6 wherein said alumina support contains a metal selected from the group consisting of alkali and alkaline earth metals in an amount sufficient to cause a concentration of such metal in the finished catalyst composition of at least 0.01 percent by weight.

References Cited
UNITED STATES PATENTS

| | | | |
|---|---|---|---|
| 3,126,426 | 3/1964 | Turnquest et al. | 260—683.3 |
| 3,067,129 | 12/1962 | Dauber et al. | 208—140 |
| 3,067,130 | 12/1962 | Baldwin et al. | 208—140 |
| 3,346,658 | 10/1967 | Mulaskey et al. | 260—683.3 X |

DELBERT E. GANTZ, *Primary Examiner.*

G. E. SCHMITKONS, *Assistant Examiner.*

U.S. Cl. X.R.

252—466